United States Patent Office 2,833,624
Patented May 6, 1958

2,833,624

PRODUCTION OF CHLORINE DIOXIDE

Jerome W. Sprauer, Wilmington, Del., assignor to E. I. du Pont de Nemours and Company, Wilmington, Del., a corporation of Delaware No Drawing. Application October 2, 1956
Serial No. 613,382

6 Claims. (Cl. 23—152)

This invention relates to the production of chlorine dioxide, particularly by an improved method involving the reaction between a chlorate, a strong mineral acid and hydrogen peroxide.

Various methods heretofore proposed for producing chlorine dioxide yield chlorine dioxide contaminated with chlorine formed as a by-product. An exception to such methods is one which involves the reaction between a chlorate, a strong acid and hydrogen peroxide according to the equation:

$$2ClO_3^- + 2H^+ + H_2O_2 \rightarrow 2ClO_2 + 2H_2O + O_2$$

The hydrogen peroxide appears to function in the reaction as a selective reducing agent to form chlorine dioxide without the formation of chlorine or perchlorate. The reaction has been carried out in the presence or absence of chloride ion.

It has previously been thought that temperatures above 70° C. should be carefully avoided in carrying out the reaction represented by the above equation, otherwise poor conversion of chlorate to chlorine dioxide would result and dangerous explosive decompositions would be involved. Consequently, the reaction has usually been carried out at temperatures well below 70° C. Such lower temperatures require relatively long reaction times whether or not a chloride is present in the reaction mixture.

In practically all prior methods for producing chlorine dioxide from chlorates, including that above employing hydrogen peroxide as a reactant, the practice has been to strip the chlorine dioxide from the reaction mixture as it is formed by means of an aerating gas stream. Such practice is distinctly disadvantageous when the chlorine dioxide is required as a dilute solution since the chlorine dioxide must be reabsorbed from the carrier gas to produce the dilute solution.

It is an object of the invention to provide an improved method for producing chlorine dioxide involving the reaction of a chlorate, a strong acid and hydrogen peroxide. A particular object is to provide an improved and efficient method whereby such reaction is carried out rapidly, continuously and without undue hazards to produce dilute solutions of chlorine dioxide directly. Other objects will be apparent from the following description.

The objects of the invention are accomplished by continuously feeding in reacting proportions to produce chlorine dioxide, aqueous solutions of a metal chlorate of the kind indicated below, an inorganic chloride of the kind indicated below, hydrogen peroxide and a strong mineral acid into a reaction zone wherein said solutions are rapidly mixed and the resulting mixture is maintained at a temperature substantially above 70° C. for a time not exceeding 5 minutes, while continuously removing reacted mixture from the reaction zone at a rate corresponding to the rate of feed of materials thereto. Preferably, the reacted mixture is continuously diluted immediately upon removal from the reaction zone to produce continuously and directly dilute chlorine dioxide product solution.

Contrary to prior practice and teachings, it has now been discovered that reaction temperatures substantially above 70° C. are not only practical but highly advantageous, provided the reaction to produce chlorine dioxide is carried out in the presence of a chloride, which catalyzes the reaction, and of sufficient peroxide to suppress the formation of free chlorine, which retards the reaction. It has been found that under these conditions and at such higher temperatures, chlorine dioxide is produced rapidly at high yield and without excessive decomposition or explosion hazard. The reaction is usually complete in a reaction time of not more than 5 minutes and under preferred conditions reaction times not exceeding about one minute generally are satisfactory.

Any of the metal chlorates of the alkali metal and the alkaline earth metal groups, or magnesium chlorate, may be used in practicing the invention, sodium chlorate being preferred for cost and availability reasons.

Similarly, any of the alkali metal and alkaline earth metal chlorides, or magnesium chloride or hydrogen chloride, may be used as the source of the chloride ion catalyst. Sodium chloride is preferred.

Any strong mineral acid may be used as the acid reactant. Suitable acids are phosphoric, perchloric, hydrochloric and sulfuric acids, the latter being generally preferred. Hydrochloric acid can be used as the source, in full or in part, of both the strong acid and the chloride ion.

Aqueous hydrogen peroxide of the more usually available commercial 30 to 50% strengths will generally be used as the peroxide reactant. The less readily available more concentrated hydrogen peroxide solutions, e. g. 70% and higher, can also be used. Equivalent sources of peroxide such as sodium peroxide, sodium perborate, sodium carbonate perhydrate and the like may be used if additional strong acid is employed to neutralize the additional alkalinity of such source of peroxide.

It is essential that the chlorate and the strong acid be fed separately to the reaction zone. Each of the reactants and the chloride catalyst can be separately fed. However, it is usually most convenient to premix the peroxide, chlorate and chloride, and to feed the resulting single solution of these materials to the reaction zone while the strong acid is fed separately. If desired, the peroxide may be premixed with the acid, the resulting solution being then fed separately from another solution containing both the chlorate and chloride. It is generally advantageous to employ chlorate, chloride and peroxide solution or solutions as concentrated as feasible, keeping in mind the proper proportioning of the reactants and catalyst.

The mole ratio of chloride ion (Cl⁻) to chlorate ion (ClO₃⁻) in the reaction mixture may be varied considerably, e. g., from 0.1 to 2, but a ratio of about 0.3, corresponding to such ratio for the typical sodium chlorate cell liquor, is preferred.

The mole ratio of hydrogen peroxide ($H_2O_2$) to chlorate ion will generally range from 0.2 to 1. A mole ratio of 0.5 corresponding to stoichiometric proportions, is preferred when product substantially free from chlorine and hydrogen peroxide is desired. Use of less than the stoichiometric proportion of peroxide tends to give product containing free chlorine. The use of more peroxide minimizes chlorine formation and accelerates the reaction rate but gives a product containing the excess peroxide, which may be advantageous in special cases. In a preferred embodiment, sodium chlorate cell liquor and hydrogen peroxide are mixed to obtain, for example, a solution containing sodium chlorate, sodium chloride and hydrogen peroxide at molar concentrations, respectively, of 3.9, 1.1 and 1.95. Such a solution and the strong acid are fed continuously but separately to the reaction zone maintained at the required temperature.

In general, the strong acid will be moderately concentrated, e. g. 30 to 95% in the case of sulfuric acid, but the optimum concentration will depend somewhat upon the concentration of the chlorate in the solution with which it is mixed. Acid somewhat in excess of the stoichiometric amounts is required. The amount of acid generally should be sufficient to give in the reaction mixture a pH not exceeding about 1 and an amount equivalent to at least about 3 moles of hydrogen ion ($H^+$) per mole of chlorate ion is preferred.

Mixing of the separately added solutions in the reaction zone should be effected under agitation effective to cause turbulent flow. Such mixing is most conveniently effected in a pipeline type reactor to which the solutions are continuously and separately added in proper proportions. The solutions are mixed through turbulent flow through the reactor which is designed to provide the desired residence time.

To obtain the desired rapid reaction, the reaction temperature should be substantially above 70° C., e. g. at least 75° C. No difficulty with excessive decomposition or explosion has been experienced at temperatures up to 100° C. and it is possible that even higher temperatures can be used. At temperatures ranging from 80 to 90° C., the reaction appears to be as rapid as needed and these temperatures are preferred.

Control of the temperature in the reaction zone can be effected in part as desired by external heating or cooling. However, it is generally more practical to adjust the temperatures and concentrations of the feed solutions to obtain the desired temperature by adiabatic reaction. This is feasible, for example, by feeding to and mixing in the reaction zone in the proper proportions the preferred chlorate liquor (containing chlorate, chloride and hydrogen peroxide at molar concentrations, respectively, of 3.9, 1.1 and 1.95) with 90% sulfuric acid, whereby the heat of reaction and heat of dilution of the sulfuric acid are sufficient to give an end temperature of about 80° C.

Contact or reaction times longer than about one minute tend to give somewhat higher conversions of chlorate to chlorine dioxide, but such gain is offset by the greater cost of larger reactor spaces to provide the longer time. Furthermore, the use of small reactor spaces, e. g. to provide reaction times of not over 5 minutes and preferably not over 1 minute, reduces the explosion hazard due to mal-operation. Thus, by using a small reaction space consistent with a reaction time of not over about 1 minute, the capacity of the equipment for dangerous material is minimized, and by proper construction and shielding of the equipment, the entire operation can be made innocuous and substantially foolproof. Under optimum conditions, 90% or better conversion of the chlorate to chlorine dioxide in a reaction time of one minute is possible.

The effluent chlorine dioxide solution from the reaction zone may be used in known manner. Thus, it may be mixed with sufficient inert gas to provide a gas phase containing chlorine dioxide at a known safe concentration. For example, the effluent reaction mixture may be sprayed into a large volume of air, or stripped countercurrently with air. The resulting gas mixture containing chlorine dioxide at a safe concentration can be used as such or its content of chlorine dioxide may be absorbed in water to provide a dilute chlorine dioxide solution for bleaching or other purposes.

Preferably, the reactor effluent is quenched by mixing in a turbulent zone with large amounts of water at room or lower temperature to produce directly dilute chlorine dioxide solution for bleaching or other uses, without the necessity of stripping out the chlorine dioxide with an inert gas and reabsorbing it. For some purposes requiring dilute gaseous chlorine dioxide, the aqueous solution resulting from such dilution of the reactor effluent can be stripped by means of air or other inert gas in complete safety to provide the desired dilute gaseous chlorine dioxide. In such case, there is no necessity for automatic controls and safeguards to avoid hazardous concentrations of gaseous chlorine dioxide, since the gas concentration cannot exceed the equilibrium vapor pressure of the aqueous solution from which the chlorine dioxide is stripped.

The diluted product solution stream may contain more acid than required or desired for some uses. In such cases, the excess acid may be simply neutralized by mixing the diluted stream with the required amount of alkali or adding alkali to the quenching stream, preferably continuously.

The presence of excess peroxide in the diluted product solution stream may tend to reduce chlorine dioxide to chlorite according to the equation:

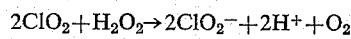

Such reaction can be avoided by properly proportioning the feed streams to the reactor so as to minimize excess peroxide.

If a product solution containing chlorite is desired, it can be readily produced by proportioning the feed streams so as to provide the proper excess of peroxide and by reacting the product stream with at least sufficient alkali to neutralize. In this case the over-all reaction is:

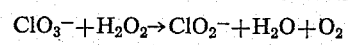

If a dilute solution containing both chlorine dioxide and peroxide is desired, it has been found that chlorite formation resulting from the presence of excess peroxide can be minimized by neutralizing the diluted product solution stream to weakly acidic condition with a weak base, such as sodium acetate. While peroxide reduction of chlorine dioxide to chlorite is thermodynamically favorable in weakly acidic solution, the rate of such reduction is very slow. For example, solutions of chlorine dioxide and hydrogen peroxide at pH 3 are relatively stable for some hours even at temperatures up to 70° C.

The invention is illustrated by the following examples in which all percentage concentrations are by weight.

*Example 1*

A solution containing sodium chlorate ($NaClO_3$), sodium chloride ($NaCl$), and hydrogen peroxide ($H_2O_2$) at molar concentrations, respectively, of 3.9, 1.1 and 1.95, and 90% sulfuric acid (both solutions at room temperature) are pumped separately and continuously into a pipeline reactor in the proportion of one volume of the chlorate solution per 0.58 volume of the acid. The reactor is designed to provide mixing of the solutions under turbulent flow with a contact time of about 1 minute. The temperature of the mixture in the reaction zone is about 80° C. The resulting reacted mixture is then continuously quenched by mixing it with water at room temperature in the pipeline in turbulant flow, the water being added in the proportion of about 70 volumes per volume of chlorate solution charged. The concentration of chlorine dioxide in the diluted solution is about 0.05 molar and the yield of chlorine dioxide is about 90% based on the chlorate charged.

*Example 2*

One volume of a solution containing chlorine dioxide, sodium chloride, sodium bisulfate ($NaHSO_4$) and hydrogen peroxide at molar concentrations, respectively, of 0.05, 0.05, 0.05 and 0.02, is mixed under vigorous agitation with 0.056 volume of a 1 M sodium acetate solution. The mole ratio of chlorite to chlorine dioxide in the resulting solution is only 0.04, showing that excess acid in the presence of both chlorine dioxide and hydrogen peroxide can be neutralized with only slight reaction occurring.

Example 3

To a solution containing chlorine dioxide, chlorine, sulfuric acid and sodium bisulfate at molar concentrations, respectviely, of 0.08, 0.039, 0.1 and 0.2, there is added under vigorous agitation aqueous 35% hydrogen peroxide in an amount about equivalent to the chlorine content of the solution. The concentration of chlorine dioxide following the addition is 0.076 molar; there is a trace of hydrogen peroxide and no detectable chlorine, showing selective reduction of chlorine by hydrogen peroxide in acidic chlorine dioxide solution.

Example 4

One volume of a solution containing sodium chlorate, sodium chloride and hydrogen peroxide at molar concentrations, respectively, of 3.9, 1.1 and 1.95, and 2.1 volumes of 50% sulfuric acid (both solutions initially at 80° C.) are mixed together rapidly under vigorous agitation. After 15 seconds, the resulting mixture is quenched by rapid dilution with water at room temperature. The diluted solution contains chlorine dioxide equivalent to 72% of the chlorate charged.

The invention provides a rapid continuous method for producing chlorine dioxide. It can be operated to produce chlorine dioxide substantially free of chlorine and to produce directly chlorine dioxide solutions at safe concentrations for various uses such as bleaching.

I claim:

1. The method of producing chlorine dioxide comprising continuously feeding, in reacting proportions to produce chlorine dioxide, aqueous solutions of a chlorate of the group consisting of the alkali metal chlorates, the alkaline earth metal chlorates and magnesium chlorate; a chloride of the group consisting of the alkali metal chlorides, the alkaline earth metal chlorides, magnesium chloride and hydrogen chloride; hydrogen peroxide and a strong mineral acid into a reaction zone wherein said solutions are rapidly mixed and the resulting mixture is maintained for a time not exceeding 5 minutes at a temperature in the range 75 to 100° C., the solution of said acid being fed into said zone separately from the solution of said chlorate, while continuously removing reacted mixture comprising a solution of chlorine dioxide from said reaction zone at a rate corresponding to the rate of feed of materials into said reaction zone, said chlorate, chloride and hydrogen peroxide being employed in proportions equivalent to 0.1 to 2 moles of chloride ion and 0.2 to 1 mole of peroxide per mole of chlorate ion.

2. The method of claim 1 wherein the reacted mixture removed from the reaction zone is immediately diluted with water to provide directly a dilute solution comprising chlorine dioxide.

3. The method of claim 1 employing sodium chlorate, sodium chloride, hydrogen peroxide and sulfuric acid.

4. The method for producing chlorine dioxide comprising continuously and separately feeding a sulfuric acid solution and a solution comprising sodium chlorate, sodium chloride and hydrogen peroxide in the mole proportions of 0.1 to 2 moles of the chloride and 0.2 to 1 mole of the peroxide per mole of chlorate, into a pipeline reactor wherein said solutions are continuously mixed under turbulent flow and the resulting mixture is maintained at 75 to 100° C. for a time not exceeding 5 minutes, the feeds of said solutions being proportioned to give a mixture having a pH not exceeding 1, and continuously removing from said reactor a reacted mixture comprising a solution of chlorine dioxide at a rate corresponding to the rate of feed of solutions into said reactor.

5. The method of claim 4 wherein the reacted mixture is immediately diluted with water to provide directly a dilute solution comprising chlorine dioxide.

6. The method of claim 5 employing a feed solution containing sodium chlorate, sodium chloride and hydrogen peroxide in molar concentrations, respectively of about 3.9, 1.1 and 1.95 and a sulfuric acid feed solution of a concentration in the range 30 to 95%.

References Cited in the file of this patent
UNITED STATES PATENTS

| | | |
|---|---|---|
| 2,317,443 | Cunningham | Apr. 27, 1943 |
| 2,332,181 | Soule | Oct. 19, 1943 |

OTHER REFERENCES

Baker's Specification Catalog of Baker Analyzed Reagents, April 1954, page 186. J. T. Baker Chemical Co., Phillipsburg, New Jersey.